Patented Mar. 10, 1942

2,275,606

UNITED STATES PATENT OFFICE 2,275,606

TERPENE-CYANOACYL COMPOUNDS AND METHODS OF PRODUCING SAME

Joseph N. Borglin, Wilmington, Del., assignor to Hercules Powder Company, Wilmington, Del., a corporation of Delaware No Drawing. Application March 20, 1941,
Serial No. 384,345

16 Claims. (Cl. 260—454)

This invention relates to a new series of terpene compounds and more particularly to a new series of terpene compounds having the type formula ROOCR'XCN, in which R is a radical of a terpene aromatic ether, in which R' is an aliphatic or aromatic radical, and in which X is a member of the group consisting of sulfur, selenium and tellurium. The invention also relates to a method for the production of these compounds.

By the method in accordance with this invention, I react a terpene aromatic ether with a halogenated organic acid and then with a metal thiocyanate, a metal selenocyanate, or a metal tellurocyanate, which is reacted upon under the conditions employed.

The terpene aromatic ether which is utilized in the method according to this invention will consist of a terpene radical and an aromatic compound radical held together by ether linkage. It may be prepared by etherification of a terpene alcohol with an aromatic compound containing a hydroxyl capable of ether formation, or with an aromatic olefinic oxide. The ether may also be prepared, for example, by an additive reaction between an unsaturated terpene compound and an aromatic alcohol by the method, for example, described in U. S. Patent 2,136,011, which issued November 8, 1938 to I. W. Humphrey, or in U. S. Patent 2,182,826, which issued December 12, 1939, to D. H. Sheffield.

The aromatic radical of the terpene aromatic ether will be a radical derived by ether formation from an aromatic alcohol, by which term is meant an aromatic compound (aryl, alkaryl or aralkyl, including substituted derivatives) containing a hydroxyl group capable of ether formation. This aromatic alcohol radical may be derived from phenols which are considered herein as alcohols, such as, for example, phenol, cresol, xylenol, resorcinol, hydroquinone, phloroglucinol, pyrogallol, eugenol, chavicol, thymol, carvacrol, monochlorophenol, mononitrophenol, alpha naphthol, beta naphthol, orcinol, guaiacol, hydroxyanthraquinones and the like, by etherification of one or more of the hydroxyls thereof or it may be derived from other hydroxy aromatic compounds, such as, for example, benzyl alcohol, phenoyl ethyl alcohol, phenoxy ethyl alcohol, phenoxy glycol, phenoxy ether of glycerol, mesityl alcohol, mellityl alcohol, benzyl methyl carbinol, saligenin, vanillyl alcohol, phthalyl alcohol, phenyl glycolic acid, cinnamyl alcohol and the like. The terpene radical may be derived from any of such terpenes as, for example, pinene, dipentene, terpinene, terpinolene, camphene, menthene, carene, sabinene, terpineol, borneol, isoborneol, fenchyl alcohol, terpinyl acetate, or crude terpene cuts such as wood turpentine, gum turpentine, pine oil and the like, it being understood that the term "terpene" is used herein as inclusive of derivaties of the terpene hydrocarbons as well as the terpene hydrocarbons.

Thus, for example, utilizing the ethers made from the additive reaction of alpha-pinene with phenol, resorcinol, benzyl alcohol, the phenyl ether of glycerol and the like, thiocyanoacetates, thiocyanopropionates, selenocyanocetates, etc., of such ethers will be produced. More specifically, thiocyanoacyl products made from these ethers derived from pinene will comprise thiocyanoacyl esters derived from terpinyl ethers, fenchyl ethers, bornyl ethers and isobornyl ethers of the particular aromatic alcohols used. The terpinyl ethers usually are in the greatest quantity. The ethers prepared by reacting phenol, resorcinol and the phenyl ether of glycerol with alpha-pinene or beta-pinene are preferred because of the economy of the raw materials and because of the effectiveness of the products obtained therefrom in toxicity to lower organisms. The pinenes may be utilized in pure form or in the form of wood or gum turpentine or distilled portions thereof. However, the terpene aromatic ether which I utilize is limited only in that it must be unsaturated in the terpenic portion thereof, or be capable of rearrangement to a form unsaturated in the terpenic portion, or carry an esterifiable hydroxyl group.

The halogenated organic acid which I use may be such as, for example, monochloracetic acid, dichloracetic acid, trichloroacetic acid, alpha-chloropropionic acid, beta-chloropropionic acid, alpha-chlorobutyric acid, beta-chlorobutyric acid, gamma-chlorobutyric acid, a dichloropropionic acid, a dichlorobutyric acid, a chlorovaleric acid, a chlorocaproic acid, chloronaphthenic acid, chlorobenzoic acid, chloromalonic acid, chlorophthalic acid, chlorolauric acid, chloromyristic acid, chloropalmitic acid, chloroleic acid, chlororicinoleic acid, chlorostearic acid, chlorobehenic acid, etc., and the corresponding fluorine, bromine, and iodine substituted acids. Mixtures of the acids may be used if desired.

The metal thiocyanate which I use may be any metal thiocyanate which is reactive under the conditions employed. To be reactive under the conditions employed, it must be partially or completely soluble in the reaction mixture utilized.

Suitable metal thiocyanates, for example, are sodium thiocyanate, potassium thiocyanate, lithium thiocyanate, ammonium thiocyanate, calcium thiocyanate, etc. When it is desired to make the terpene selenocyanate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The terpene ether will first be reacted with a halogenated acid and the resulting halogen acid ester of the terpene isolated from the by-products of the reaction. Preferably, acidic material is eliminated as by washing with water. The second stage of the reaction is the treatment of this halogen substituted acid ester of the terpene ether with the metallic thiocyanate, selenocyanate, or tellurocyanate, as the case may be, followed by recovery of the product. I may carry out each of these steps in the presence of a suitable solvent which is substantially inert, such as, for example, methanol, ethanol, isopropanol, propanol, acetone, ethyl acetate. In fact, I prefer to use an inert solvent in the second stage. Each step may be carried out at any temperature within the range of about 0° C. to about 250° C., and preferably within the range of about 30° C. to about 180° C.

The halogen substituted acylates of the first stage reaction are light in color if the reaction is carried out in the absence of oxygen, for example, under a blanket of $CO_2$. Substantially water white esters may be obtained by vacuum distillation. The color of the thiocyanoacylate products follows the color of the first stage ester from which they are prepared. Where very light colored products are desired and where it is desired to insure products of no odor or minimum odor, the first stage reaction may be conducted, if desired, in a non-oxidizing atmosphere, or the first stage product may be vacuum distilled, or both these measures may be taken.

In the reaction according to this invention, the halogenated acid may react at one or more reactive positions of the ether utilized according to the number of reactive positions available and the conditions of the reaction. It may react by addition at a double bond, or at a position of latent unsaturation produced by bridge opening in a complex polycyclic terpene compound, or at a hydroxyl group if there is one. Thus, in some cases, more than one thiocyanoacyl unit may be introduced.

The method in accordance with this invention will be further illustrated by the examples which follow. In the examples all parts and percentages will be by weight unless otherwise specified.

*Example 1*

One hundred and thirty-six parts of beta-pinene, 126 parts of glycerol monophenyl ether and 2.25 parts of paratoluene sulfonic acid were stirred together and heated on a steam bath for approximately three hours. The mixture was then placed in an oil bath and the temperature raised over ten hours from 100° C. to 150° C. Carbon dioxide was bubbled through the mixture during the entire reaction period. The resulting reaction mixture was then dissolved in 190 parts of benzene and the solution washed three times with 200 parts of water. Volatile material including unreacted pinene was removed by vacuum distillation leaving 185.5 parts of terpene aromatic ethers.

One hundred and four parts of chloroacetic acid and 40 parts of toluene were added to the terpene aromatic ether and the mixture was refluxed in an oil bath, separating out water from the refluxed vapors but permitting return of the toluene to the reaction mixture. This was continued for 8 hours and temperature gradually raised from 135 to 190° C. for 10 or 12 hours, allowing the major portion of the toluene to evaporate through the condenser. The resulting mixture was then dissolved in 220 parts of benzene, washed 4 times, each with 200 parts of water, and the volatile material was distilled therefrom under reduced pressure, leaving 238.9 parts of a light amber chloroacetic ester having a chlorine content of 11.7%.

The chloroacetic ester was dissolved in 180 parts of 95% ethanol and refluxed for 3 hours with 75 parts of sodium thiocyanate. The reaction mixture was taken up in 500 parts of benzene and the solution washed 4 times with water. The volatile solvent was then distilled off at reduced pressure. The product separated into 2 layers, the lower layer amounting to 193 parts of a dark red liquid representing the thiocyanoacetate of the terpene phenoxy glycerol ether. This product had a combined sulfur content of 11.6%.

*Example 2*

One hundred and thirty-six parts "Solvenol" (a commercial mixture of monocyclic terpenes), 110 parts resorcinol, and 2.25 parts para-toluene sulfonic acid were heated on a steam bath with occasional shaking for 3 hours and in an oil bath, the temperature of the mixture being raised from 100° C. to 155° C. in 4 hours. During this period, carbon dioxide was bubbled through the reaction mixture. The reaction mixture was then dissolved in a mixture of 200 parts benzene and 100 parts ethyl acetate, and the solution washed three times with water (200 parts used for each wash). The solvents and unreacted Solvenol were then removed by steam distillation. The distillation residue was then dried by dissolving in benzene and distilling an azeotropic mixture of benzene and water. The yield was 189.6 parts.

To the above mixture of resorcinol-terpene ethers, 104 parts chloroacetic acid was added and the mixture heated in an oil bath, using a carbon dioxide sparge to maintain an inert atmosphere. The following heating schedule was carried out: 6 hours at 107–128° C., 16 hours at 128–133° C., 8 hours at 133–155° C., and 14 hours at 155–180° C. The reaction mixture was dissolved in 440 parts benzene and the solution washed 9 times with water (300 parts for each wash). This was followed by distillation at reduced pressure to remove the solvent. A very dark red solid residue of 230.4 parts with 6.3% chlorine content was obtained.

The chloroacetate thus obtained was dissolved in 200 parts 95% ethanol and, after adding 80 parts sodium thiocyanate, refluxed for 2.5 hours in an oil bath. Subsequently, the reaction mixture was dissolved in 440 parts benzene. A small difficultly soluble portion was dissolved in ethyl acetate and the combined solutions washed with water six times (500 parts, later 400 parts, were used for each wash). The wash liquids were counter washed with benzene and the extracts thus obtained combined with the main solution. The solvent was then removed by distillation at reduced pressure, whereby 230.5 parts of a dark red solid residue was obtained. Its combined sulfur content was 4.5%.

*Example 3*

One hundred and thirty-six parts beta-pinene, 108 parts benzyl alcohol and 2.25 parts paratoluene sulfonic acid were heated in an oil bath under a carbon dioxide blanket for 5 hours at 70–130° C. 50 cc. toluene was added to the mixture and the reaction vessel was equipped with the same attachment for the separation of water as used in Example 1. In the course of 10 hours of refluxing approximately 8 parts water separated out. The attachment was then replaced by an air condenser and the temperature raised to the range of 160–182° C. where it was maintained for an additional 10 hours. The reaction mixture was then dissolved in 220 parts benzene and the solution washed with water 3 times (200 parts used for each wash). This was followed by steam distillation to remove the solvent and unreacted pinene. The distillation residue was dehydrated by azeotropic distillation with benzene.

To the above benzyl-terpene ether, 104 parts chloroacetic acid and 40 parts benzene were added, and the mixture was refluxed for 14 hours, separating the water formed in the reaction by the same attachment as used in Example 1. This was then replaced by an air condenser and the heating continued for 8 hours at 135–153° C., and for 9 hours at 158–197° C. The reaction mixture was then dissolved in 260 parts of benzene and the solution was washed 8 times with water (200 parts used for each wash). After removing the solvent by distillation at reduced pressure, 165.4 parts of an amber colored viscous liquid of 6.0% chlorine content was obtained.

To the chloroacetate thus obtained, 80 parts 95% alcohol, 120 parts acetone and 50 parts sodium thiocyanate were added, and the whole refluxed under a carbon dioxide blanket for 6 hours. Then the acetone was distilled off, 80 parts 95% alcohol added and the whole refluxed for 3–4 hours more. The reaction mixture was dissolved in 260 parts benzene and the solution washed 8 times with water (250 parts for each wash). After distilling off the solvent at reduced pressure, 158.6 parts of dark brown thick fluid residue was obtained. The thiocyanoacetate ester thus prepared contained 5.2% sulfur.

*Example 4*

Fifty-four parts of terpineol, 65.1 parts paratertiary amyl phenol, and 0.9 part para-toluene sulfonic acid were heated in an oil bath under a carbon dioxide blanket for 14 hours, raising the temperature gradually to a maximum of 155° C. 80 parts carbon tetrachloride were added to the reaction mixture, and a device making possible refluxing with separation of the water formed was attached to the reaction vessel. Over 9 hours, the reflux temperature rose from 112° C. to 160° C. The reaction mixture was then diluted with 85 parts of benzene, washed 3 times with water (100 parts for each wash) and subjected to steam distillation. The distillation residue was then charged into a distillation pot equipped with water-separating refluxing equipment, and was dehydrated by distillation with benzene.

To the ether thus obtained, 84 parts chloroacetic acid was added and the mixture was refluxed in the same apparatus for 6–7 hours at 125–130° C. Using an air condenser, the temperature of the reaction mixture was raised to 160–167° C.; after 4 hours, it was further increased and kept in the range of 170–192° C. for an additional 10 hours. The reaction mixture was then dissolved in 260 parts benzene and the solution washed 9 times with water (200 parts for each wash). After distilling off the solvent at reduced pressure, the yield was 107 parts of a dark, very viscous fluid containing 3.4% chlorine.

The above chloroacetate was dissolved in 80 parts 95% ethanol and 25 parts sodium thiocyanate added. The heterogeneous mixture was then refluxed in an oil bath for 6 hours. After that, the reaction mixture was dissolved in 260 parts benzene and the solution washed 9 times with water, using 200–250 parts for each wash, and counter washing the first few aqueous layers with benzene. The solvent was removed by distillation at reduced pressure. 101.6 parts dark brown syrupy residue were obtained. The combined sulfur content was 2.3%.

*Example 5*

Ninety-four parts phenol, 136 parts dipentene, and 2.25 parts para-toluene sulfonic acid were heated in a water bath of slowly rising temperature. When the temperature of the reaction mixture exceeded that of the water, temporary cooling was applied, then the heating continued at 67–95° C. for 5 hours, after which the water bath was replaced by an oil bath and the temperature raised gradually from 95° C. to 125° C. in about 6 hours. This was followed by heating at 150–160 C. for 8 hours, and, finally, the temperature was maintained at 175–185° C. for 3 hours. The reaction mixture was then dissolved in 220 parts benzene, the solution washed with water, steam distilled, and the residue dehydrated by refluxing with benzene, making use of a water separating attachment.

To the phenyl-terpene ether thus prepared, 104 parts chloroacetic acid was added, and the mixture heated at 100–135° C. for 6 hours and at 160–190° C. for 13 hours. The reaction mixture was dissolved in 260 parts benzene and washed with water 8 times (200 parts used for each wash). After filtration, the solvent was distilled off at reduced pressure. 161 parts dark brown, almost solid syrupy residue with a chlorine content of 3.4% were obtained.

The chloroacetate thus obtained was dissolved in 80 parts hot alcohol, and, after adding 30 parts of sodium thiocyanate, the whole was refluxed under a carbon dioxide blanket for 3–4 hours. The reaction mixture was then dissolved in 220 parts benzene, and the solution washed with water 11 times (200 parts water for each wash). The first few wash liquids were counter washed with benzene and ether and the extracts thus obtained were combined with the main solution. Finally, the solvents were distilled off and 156.2 parts dark brown, very viscous syrupy residue was obtained. This thiocyanoacetate contained 3% sulfur.

*Example 6*

One hundred and eight parts o-cresol, 154 parts alphaterpineol, 2.25 parts para-toluene sulfonic acid and 40 parts toluene were refluxed under a carbon dioxide blanket. After refluxing for about 10 hours, with removal of water formed, the reaction mixture was dissolved in 220 parts benzene, and the solution washed 3 times with water (200 parts for each wash). The solvent was then removed by steam distillation.

The cresol-terpene ether thus obtained was dehydrated by refluxing with carbon tetrachloride, using an attachment suitable for the separation of water from a heavier-than-water solvent. 104 parts chloroacetic acid was then added and refluxing continued in the same apparatus for 16 hours. The attachment was removed and the heating continued at 135–154° C. for 7 hours and at 177–192° C. for 12 hours. Subsequently the reaction mixture was dissolved in 260 parts of benzene and the solution was washed 6 times with water (200 parts for each wash). After filtration, the solvent was distilled off at reduced pressure, whereby 245.8 parts dark brown semisolid product of 3.4% chlorine content was obtained.

The chloroacetate thus obtained was dissolved in 80 parts of 95% alcohol and 20 parts of acetone, and the solution, after adding 40 parts sodium thiocyanate, was refluxed for 6 hours. After distilling off about 80 parts of solvent, 80 parts of 95% alcohol were added, and the whole refluxed again for 1.5 hours. The reaction mixture was then dissolved in 430 parts of benzene and the solution washed 10 times with water (400 parts for each wash). The first 5 washes were counterwashed with benzene and the extracts thus obtained were combined with the main solution. After filtration, the solvent was distilled off at reduced pressure whereby 234.8 parts of a dark brown semisolid residue was obtained. The sulfur content of this thiocyanoacetate was 2.3%.

*Example 7*

One hundred and thirty-six parts alpha-pinene (steam distilled over sodium hydroxide), 126 parts pyrogallol and 2.25 parts para-toluene sulfonic acid were agitated in a reaction vessel equipped for both heating and cooling and with a reflux condenser of large volume sufficient to hold the entire batch. The reaction mixture was first heated to about 110–115° C. until a strong exothermic reaction set in. Efficient cooling with cold water was then applied to check the violence of the reaction. (Occasionally, part of the batch was thrown up into the condenser.) After the reaction had quieted down, external heat was applied again for about 2–3 hours, maintaining a temperature of about 120–130° C. Then the reaction mass was dissolved in about 500 parts ethyl acetate and washed 3 times with water, using 200 parts for each wash. This was followed by steam distillation, which gave a brownish red, very viscous residue, a mixture of terpene-pyrogallol ethers.

To the above mixture of ethers, 100 parts chloroacetic acid and 50 parts xylene were added and the whole was refluxed with removal of water for about 50 hours, while carbon dioxide was bubbled through the reaction mixture. On cooling, it was dissolved in 300 parts benzene and washed 16 times with water (250 parts for each wash), the first few wash liquids being counterwashed with benzene. After distilling off the solvent from the combined benzene solutions, about 240 parts dark solid product of 5% chlorine content were obtained.

The above chloroacetate of the terpene-pyrogallol ether was dissolved in 200 parts 96% alcohol and the solution, after the addition of 50 parts sodium thiocyanate, was refluxed for 6 hours. The reaction mass was dissolved in a mixture of 220 parts benzene and 80 parts ethyl acetate, and the solution was washed 8 times with water (250 parts for each wash), counterwashing the combined aqueous layer with benzene-ethyl acetate mixtures. Finally, the solution was filtered and the solvent distilled off at reduced pressure. About 250 parts very dark solid product was obtained; its sulfur content was about 4%.

*Example 8*

One hundred and thirty-six parts terpinolene, 164 parts para-tertiary amyl phenol and 2.25 parts para-toluene sulfonic acid were heated in nitrogen atmosphere at about 110–115° C. until an exothermic reaction causing rapid temperature rise ensued. The homogeneous liquid was then cooled to 115–120° C. where it was kept for three hours. The temperature was slowly raised to 155° C. over another three hours. After cooling, the reaction mixture was dissolved in 170 parts benzene and the solution washed 4 times with a 10% solution of sodium hydroxide in aqueous methanol (50:50), using 100 parts of this solution for each wash. The reaction mixture thus extracted was diluted with 75 parts of ether, and washed twice with water (100 parts used for each wash). After distilling off the solvents, 177 parts product, consisting of terpene-phenol ethers, were obtained.

To the ether thus obtained, 65 parts chloroacetic acid were added and the mixture was heated for 4 hours at about 160° C.; then, after the addition of 25 parts of xylene, refluxed for 27 hours at a temperature range of 175–190° C. The reaction mixture was then dissolved in 200 parts benzene and washed 9 times with water (150 parts for each wash). After distilling off the solvent, a brown, viscous liquid of 1.75% chlorine content was recovered.

To the above chloroacetate, 100 parts alcohol, and 40 parts sodium thiocyanate were added, and the mixture was refluxed with agitation for 5 hours. After dissolving in 100 parts benzene and 25 parts ethyl acetate, washing with water followed until the wash water became practically chloride free. The solvents were distilled off at reduced pressure and a dark, very viscous thiocyanoacetate product was recovered.

*Example 9*

Sixty parts phenyl glycol, 117.5 parts alpha-terpineol, and 120 parts 40% sulfuric acid were mechanically agitated in a constant temperature bath at 45° C. for 62 hours. The reaction mixture was then dissolved in 170 parts benzene and the solution washed 3 times with water (250 parts used for each wash). The solvent and unreacted terpineol were removed by steam distillation. After drying, the distillation residue amounted to 32.4 parts.

The phenyl glycol ether of alpha-terpineol thus obtained was then refluxed with 48 parts chloroacetic acid and 40 parts benzene, removing the water formed in the reaction. After a few hours, benzene was replaced by toluene and refluxing continued for 6 hours at 132–137° C. The reflux temperature was allowed to rise to 150° C. in another six hours. By adding xylene to replace the evaporating toluene, a temperature range of 160–170° C. was maintained for 12 hours. A further temperature rise to 170–185° C. followed for another 12–13 hours. On cooling, the reaction mixture was dissolved in 100 parts benzene and the solution washed with water until the wash liquid was nearly neutral (the combined wash liquids were counterwashed with benzene). After distilling off the solvent, 39.2 parts dark brown syrupy liquid of 7.1% chlorine content were obtained.

The chloroacetate thus obtained was dissolved in 40 parts ethyl alcohol (96%), mixed with 30 parts sodium thiocyanate and the whole refluxed for 5 hours. The reaction mixture was then dissolved in 80 parts benzene and 20 parts ethyl acetate, and the solution washed with water until the wash water gave only faint reaction with silver nitrate solution. After distilling off the solvents, 39 parts thiocyanoacetate of 5.9% sulfur content was recovered.

*Example 10*

Sixty parts phenylethylene oxide, 154 parts fenchyl alcohol and 1.25 parts para-toluene sulfonic acid were heated under a carbon dioxide blanket. The temperature was raised from 120° C. to 158° C. over a period of 8 hours. 40 parts xylene were then added. After refluxing for 20 hours at 168–171° C. with removal of water formed, the reaction mixture was dissolved in 170 parts benzene and the solution washed three times with water (200 parts used for each wash). Steam distillation was then applied to remove the solvent and excess reagents. The distillation residue, after drying, amounted to 75.2 parts.

The fenchyl ether of phenylethylene glycol thus prepared, 40 parts chloroacetic acid and 40 parts of xylene were heated under reflux with provision for the elimination of water. The temperature of the reaction mixture rose to 150° C. in about 5 hours. For 15 hours, a temperature range of 160–168° C. was maintained, and, finally, for 8 hours, the temperature was 170–188° C. The reaction mixture was then dissolved in 100 parts benzene, and the solution washed with water until the wash water was nearly neutral. The combined aqueous wash liquors were counterwashed with benzene. After distilling off the solvent at reduced pressure, 73.7 parts very viscous liquid residue of brown color was obtained. Its chlorine content was 3.9%.

To the chloroacetate thus obtained, 80 parts of 96% alcohol and 25 parts sodium thiocyanate were added and the whole refluxed for 6–7 hours. The reaction mixture was then dissolved in 100 parts benzene and 50 parts ethyl acetate, and the solution washed with water until the wash water gave but faint reaction with silver nitrate solution. After distilling off the solvents, 72 parts thiocyanoacetates of 3.2% sulfur content was recovered.

The products of the examples contain unesterified terpene compounds and hydrocarbons in varying proportion. A certain portion of the original reactant is usually not esterified and, in addition, there may be some conversion of esters to terpene hydrocarbons in the second stage. The unesterified terpene compounds and hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of inert solvent from the product is usually unnecessary. However, I prefer to remove excess metal thiocyanate, selenocyanate, or tellurocyanate, and any other water-soluble material from the product, for example, by thorough washing of a solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. They are also effective in arresting the growth and in destroying bacteria and fungi. The compounds are also useful as flotation agents in the concentration of minerals. They may also be used as intermediates for the preparation of other compounds, such as, for example, wetting agents by treatment with an oxidation agent such as nitric acid. Many of the compounds possess wetting power without modification.

The term "aromatic" as used herein includes any radical containing a benzene linkage in its structure. The term "pinene," as used herein, includes both the alpha and beta forms of pinene. This application is a continuation-in-part of my previous applications Serial Nos. 311,164 and 311,165, filed December 27, 1939, now U. S. Patents 2,239,495 and 2,239,496, respectively, which are in turn continuations-in-part of my application Serial No. 198,687, filed March 29, 1938, now U. S. Patent 2,217,611.

It will be understood that the details and examples hereinbefore set forth are illustrative only and that the invention as broadly described and claimed is in no way limited thereby.

What I claim and desire to protect by Letters Patent is:

1. A terpene compound having the type formula ROOCR'XCN in which R is a radical of a terpene aromatic ether, in which R' is a radical selected from the group consisting of aliphatic radicals and aromatic radicals, and in which X is a member of the group consisting of sulfur, selenium and tellurium.

2. A terpene compound having the type formula ROOCR'SCN in which R is a radical of a terpene aromatic ether and in which R' is a radical selected from the group consisting of aliphatic radicals and aromatic radicals.

3. A thiocyanoacylate of a terpene aromatic ether.

4. A thiocyanoacylate of a terpene ether of a phenol.

5. A thiocyanoacylate of a terpene phenyl ether.

6. A thiocyanoacylate of a terpene ether of resorcinol.

7. A thiocyanoacylate of a terpene ether of an aromatic substituted aliphatic alcohol.

8. A thiocyanoacylate of a terpene ether of a phenyl ether of glycerol.

9. A thiocyanoacetate of an ether formed by the additive reaction of a pinene and phenol.

10. A thiocyanoacetate of an ether formed by the additive reaction of a pinene and resorcinol.

11. A thiocyanoacetate of an ether formed by the additive reaction of a pinene and a phenyl ether of glycerol.

12. A method for the preparation of the terpene compound described in claim 1 which comprises treating a terpene aromatic ether with a halogenated organic carboxylic acid at a temperature in the range between about 0° C. and about 250° C. to form an ester of the said acid and then treating the resulting ester with a compound selected from the group consisting of metal thiocyanates, metal selenocyanates and metal tellurocyanates, which is partially soluble in the reaction mixture, at a temperature in the range between about 0° C. and about 250° C.

13. A method for the preparation of a thiocyanoacylate of a terpene aromatic ether which comprises treating a terpene aromatic ether with a halogenated organic carboxylic acid at a temperature in the range between about 0° C. and about 250° C. to form an ester of the said acid and then treating the resulting ester with a metal thiocyanate, which is at least partially soluble in the reaction mixture, at a temperature in the range between about 0° C. and about 250° C.

14. A method for the preparation of a thiocyano substituted lower fatty acid ester of a terpene aromatic ether which comprises treating a terpene aromatic ether with a halogenated lower fatty acid at a temperature within the range between about 0° C. and about 250° C. to form an ester of the said acid and then treating the resulting ester with an alkali metal thiocyanate at a temperature within the range between about 0° C. and about 250° C.

15. A method for the preparation of a thiocyano substituted aliphatic carboxylic acid ester of a terpene aromatic ether which comprises treating a terpene aromatic ether with a brominated aliphatic carboxylic acid, at a temperature within the range between about 0° C. and about 250° C., to form an ester of the said acid and then treating the resulting ester with an alkali metal thiocyanate at a temperature within the range between about 0° C. and about 250° C.

16. A method for the preparation of a thiocyano substituted aliphatic carboxylic acid ester of a terpene aromatic ether which comprises treating a terpene aromatic ether with a chlorinated aliphatic carboxylic acid, at a temperature within the range between about 0° C. and about 250° C., to form an ester of the said acid and then treating the resulting ester with an alkali metal thiocyanate at a temperature within the range between about 0° C. and about 250° C.

JOSEPH N. BORGLIN.